United States Patent [19]

Jackson, Jr. et al.

[11] 4,201,856
[45] May 6, 1980

[54] LIQUID CRYSTAL COPOLYESTERS CONTAINING TEREPHTHALIC ACID, 2,6-NAPHTHALENEDICARBOXYLIC ACID, HYDROQUINONE AND RESORCINOL

[75] Inventors: Winston J. Jackson, Jr.; John C. Morris, both of Kingsport, Tenn.

[73] Assignee: Eastman Kodak Company, Rochester, N.Y.

[21] Appl. No.: 903,437

[22] Filed: May 8, 1978

[51] Int. Cl.$^2$ ............................................. C08G 63/18
[52] U.S. Cl. .................................. 528/190; 528/193; 528/194
[58] Field of Search ............... 260/47 C; 528/190, 193, 528/194

[56] References Cited

U.S. PATENT DOCUMENTS

| | | | |
|---|---|---|---|
| 3,160,602 | 12/1964 | Kantor et al. ............................ | 260/47 |
| 3,637,595 | 1/1972 | Cottis et al. ......................... | 260/47 C |
| 3,778,410 | 12/1973 | Kuhfass et al. .................... | 260/47 C |
| 4,083,829 | 4/1978 | Calundann et al. ................ | 260/47 C |

*Primary Examiner*—Lester L. Lee
*Attorney, Agent, or Firm*—William P. Heath, Jr.; Daniel B. Reece, III

[57] ABSTRACT

Disclosed are liquid crystal copolyesters having melting points low enough to allow the copolyesters to be melt-processed in conventional equipment. The copolyesters are prepared from terephthalic acid, 2,6-naphthalenedicarboxylic acid, a diacyl ester of hydroquinone and a diacyl ester of resorcinol and contain the following divalent radicals:

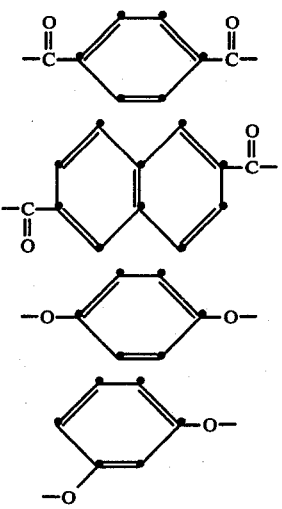

2 Claims, 1 Drawing Figure

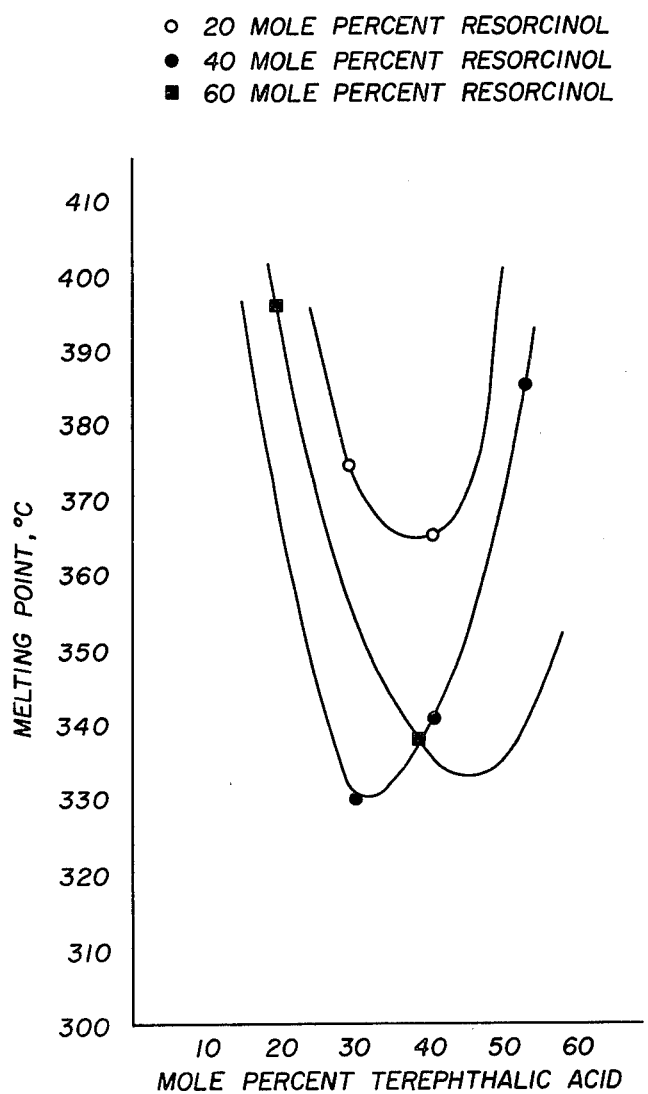

LIQUID CRYSTAL COPOLYESTERS CONTAINING TEREPHTHALIC ACID, 2,6-NAPHTHALENEDICARBOXYLIC ACID, HYDROQUINONE AND RESORCINOL

This invention relates to liquid crystal copolyesters which exhibit the exceptionally high mechanical properties typical of liquid crystal polyesters but still have a melting point low enough to allow the copolyesters to be melt-processed into useful articles using commercially available equipment.

In the last four decades, a wide variety of plastics has been developed to fulfill a wide variety of uses. Starting with the commercial introduction of nylon 66 in 1938 and continuing with the introduction of polyacetal, polycarbonate, polyphenylene oxide, polysulfone and polytetramethylene terephthalate, new plastics have been continually introduced to overcome deficiencies in previous plastics. As plastics were developed to satisfy ever more demanding requirements, the aromatic character of the polymer often increased. As the amount of aromatic character increased, the melting point of the polymer increased. Ultimately, the increased melting point of highly aromatic polymers became so high that melt processing the polymer challenged the heating capacity of even the most sophisticated melt spinning and molding equipment and even approached the thermal stability limit of the polymers themselves. Thus, as the demand for polymers with greater and greater mechanical properties was met, the melting point of the polymers generally went up.

In very recent years the never-ending search for polymers with greater and greater mechanical properties has resulted in a fundamental breakthrough in polymer science by development of a new class of polymers exhibiting a general overall balance of mechanical properties substantially enhanced over previous polymers. These polymers have been described by various terms, including "liquid crystalline", "liquid crystal", and "anisotropic". The polymers of this new class are thought to involve a parallel ordering of the molecular chains and are prepared from monomers which are generally long, flat, and fairly rigid along the long axis of the molecule.

As is the case of previous polymers, it was recognized that increasing the aromatic character of a liquid crystal polyester would enhance the general overall balance of mechanical properties. Also, just as with previous polymers, when the aromatic character of the liquid crystal polyesters became greater, the melting points became greater. In the case of previous polymers, the increasing melting point merely challenged the heating capacity of conventional equipment to heat the polymer in order to melt-process the polymer into useful articles. In the case of liquid crystal polyesters, increasing the aromatic character of the polyester created melting points that far exceeded the capability of conventional equipment to melt the polymer.

We have now discovered a wholly aromatic liquid crystal copolyester which has a melting point that is low enough to permit the copolyester to be melt processed into useful articles, such as fibers and molded articles, using conventional equipment. We have accomplished this objective of lowering the melting point by using the combination of a critical balance of terephthalic acid and 2,6-naphthalenedicarboxylic acid and a critical balance of resorcinol and hydroquinone.

Our invention, therefore, is a copolyester prepared from terephthalic acid, 2,6-naphthalenedicarboxylic acid, a diacyl ester of hydroquinone and a diacyl ester of resorcinol, and can be defined as a copolyester having a fiber-forming molecular weight consisting essentially of the following divalent radicals:

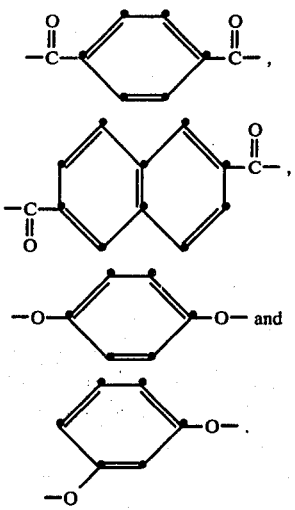

In this invention the balance of terephthalic acid and 2,6-naphthalenedicarboxylic acid is critical. The range of terephthalic acid is from 20 to 50 mole percent, based on the total moles of terephthalic acid and 2,6-naphthalenedicarboxylic acid combined. Since the critical range of terephthalic acid is based on the sum of the moles of terephthalic acid and 2,6-naphthalenedicarboxylic acid, at 20 mole percent terephthalic acid the invention contemplates the use of 80 mole percent 2,6-naphthalenedicarboxylic acid and at 50 mole percent terephthalic acid the invention contemplates the use of 50 mole percent 2,6-naphthalenedicarboxylic acid.

In a preferred embodiment the range of terephthalic acid is from 30 to 45 mole percent, based on the total moles of terephthalic acid and 2,6-naphthalenedicarboxylic acid combined.

Also in this invention a critical balance of resorcinol and hydroquinone is used. The amount of resorcinol is from 20 to 50 mole percent, based on the total moles of hydroquinone and resorcinol combined. Thus, at 25 mole percent resorcinol, the invention contemplates the use of 75 mole percent hydroquinone, and at 50 mole percent resorcinol the invention contemplates the use of 50 mole percent hydroquinone.

In a preferred embodiment the range of resorcinol is from 30 to 50 mole percent, based on the total moles of resorcinol and hydroquinone.

Applicants are aware of a large volume of prior art relating to the copolyesters of this invention.

U.S. Pat. Nos. 3,778,410 and 3,160,602 disclose processes which can be used to prepare a polyester from terephthalic acid, 2,6-naphthalenedicarboxylic acid, hydroquinone and resorcinol.

U.S. Pat. No. 3,039,992 discloses polyester prepared from terephthalic acid, hydroquinone, and resorcinol.

Belgian Pat. No. 828,935 discloses liquid crystal polyesters wherein up to 20 mole percent isophthalic acid may be present.

German Offenlegungsschrift No. 2,520,820 contains a disclosure similar to Belgian Pat. No. 828,935.

Applicants regard the closest prior art to be U.S. Pat. Nos. 3,778,410 and 3,160,602.

The copolyesters of this invention are thought to be novel over these references because even though all the materials used to prepare applicants' polymer are within the disclosure of these references, applicants believe these references do not disclose applicants' polyester in the sense of 35 USC 102 because applicants' claims are limited to the use of a combination of a critical range of terephthalic acid and a critical range of resorcinol.

The copolyesters of this invention are thought to be unobvious over these references because when one observes the limitations regarding the amount of terephthalic acid and resorcinol, the melting point of the copolyester is unobviously low compared to similar polyesters wherein these limitations are not observed.

The precise manner in which the melting points of the polyesters of the invention are unobviously lower than the melting points of similar polyesters is illustrated in the FIGURE.

In the FIGURE the amount of terephthalic acid, based on the total moles of terephthalic acid and 2,6-naphthalenedicarboxylic acid, has been plotted on the abscissa. The temperature in degrees Centigrade has been plotted on the ordinate. Melting points have been plotted for polyesters of the invention, containing a quantity of terephthalic acid in the range of 20 to 50 mole percent, based on the total moles of terephthalic acid and 2,6-naphthalenedicarboxylic acid. Suitable curves have been drawn through the data points for polyesters containing the same amount of resorcinol. For example, the lowermost curve drawn through the closed circular data points represents the melting points of polyesters containing 40 mole percent resorcinol, based on the total moles of hydroquinone and resorcinol combined. Since the amount of terephthalic acid is plotted on the abscissa and is based on the total moles of terephthalic acid and 2,6-naphthelenedicarboxylic acid combined, and since the amount of resorcinol is based on the total moles of hydroquinone and resorcinol combined, the lowermost curve, as well as the other curves, corresponds precisely to the manner used in the claims to express the various components in the polyester.

The data for the copolyesters of the invention were obtained by preparing each of the copolyesters using a process known in the art and then determining the melting points of each copolyester.

The copolyesters of the invention were prepared by an acidolysis procedure whereby terephthalic acid, 2,6-naphthalenedicarboxylic acid, a diacyl ester of hydroquinone and a diacyl ester of resorcinol are contacted under an increasing temperature ranging up to about 340°–380° C. and a decreasing pressure to form a high molecular weight polymer. As a specific example, the following procedure was used to prepare a polyester from 40 mole percent terephthalic acid and 60 mole percent 2,6-naphthalenedicarboxylic acid, based on the moles of terephthalic acid and 2,6-naphthalenedicarboxylic acid combined, and 60 mole percent hydroquinone and 40 mole percent resorcinol, based on the moles of hydroquinone and resorcinol combined.

A mixture of 33.2 g. (0.20 mole) terephthalic acid, 64.8 g. (0.30 mole) 2,6-naphthalenedicarboxylic acid, 38.8 g. (0.20 mole) resorcinol diacetate, and 66.6 g. (0.30 mole) hydroquinone dipropionate is placed in a 500-ml. flask equipped with a stirrer, short distillation column and an inlet for nitrogen. The flask is evacuated and purged three times with nitrogen and dried at 100°–110° C. for 30 minutes at <0.3 mm. pressure before being immersed in a Wood's Metal bath at 275° C. After the mixture is stirred for 30 minutes at 280° C., the temperature is raised to 300° C. for 30 minutes and then to 325° C. for 30 minutes. Finally the temperature is raised to 355° C. for 25 minutes and a vacuum of 0.5 mm. is applied. The polymerization is complete within 20 to 30 minutes. The tough, fibrous, opaque polymer obtained has a softening point of 332° C. and a melting point of 341° C. Fibers with tenacities <3 g./denier can be melt spun at 360° C. Heat-treated fibers have tenacities of 10 g./denier and higher.

The other copolyesters containing different amounts of 2,6-naphthalenedicarboxylic acid, terephthalic acid, hydroquinone and resorcinol can be prepared by a similar procedure but using slightly different reaction temperatures because of differences in melting-points.

Solid-phase polymerization also may be used to increase the molecular weight of the copolyesters of the invention by heating polymer particles in an inert atmosphere or under reduced pressure at a temperature below that at which the particles will become tacky and tend to fuse together. Since this thermal treatment may give polymers with increased crystallinity and melting points, compared to melt phase polymerization, melt phase polymerization is generally preferred. Solid-phase polymerization is preferred, however, if the melting point is above 380° C.

The melting points of the copolyesters of the invention were determined with a Perkin-Elmer DSC-2 differential scanning calorimeter.

As can be appreciated from a consideration of the curves in the FIGURE, the melting points of the polyesters of the invention containing 20 to 50 mole percent terephthalic acid and 20 to 65 mole percent resorcinol are unobviously lower than the melting points of polyesters containing less than 20 or more than 50 mole percent terephthalic acid. For example, consider the polyester which contains a constant value of 40 mole percent resorcinol and is represented by the lower curve connecting the closed circuit data points. When the amount of terephthalic acid is below 20 mole percent, the melting point is above 400° C. As the amount of terephthalic acid is increased, the melting point falls and reaches a miminum value of about 330° C. at around 30 mole percent terephthalic acid. As the amount of terephthalic acid is increased, the melting point goes up and is 385° C. at 50 mole percent terephthalic acid.

Although the details of the reduction in melting point have been discussed only for the polyester containing 40 mole percent resorcinol, the same lowering of the melting point applies to the other polyesters within the scope of this invention. For example, the melting point of the polyesters containing 20 and 50 mole percent resorcinol is also substantially lowered when from 20 to 50 mole percent terephthalic acid is used. Although melting point data is not plotted for polyesters containing less than 20 mole percent terephthalic acid, it is clear from the shape of the curve melting points are above 400° C.

A wide variety of diacyl esters of hydroquinone and resorcinol can be used to prepare the copolyesters of this invention. Examples of diesters include the diacetate, dipropionate, dibutyrate and dibenzoate. The diacetate and dipropionate are preferred.

The copolyesters of this invention are described as "consisting essentially of" the various radicals. By the term "consisting essentially of" we mean that the copolyester can contain other divalent radicals as long as the melting points of the copolyesters of the invention remain unobvious in view of the melting points of similar copolyesters not containing the critical range of terephthalic acid and resorcinol. For example, minor amounts of other naphthalenedicarboxylic acid isomers can be used in addition to the 2,6- isomer. Also, dicarboxylic acids other than terephthalic acid and diols other than hydroquinone and resorcinol can be used. By the term "consisting essentially of" we mean also that the copolyesters of this invention may contain nucleating agents, fillers, pigments, glass fibers, asbestos fibers, antioxidants, stabilizers, plasticizers, lubricants, fire-retardants, and other additives.

The inherent viscosity of the copolyesters of this invention cannot be determined because the copolyesters of this invention are insoluble in typical solvents used for determining inherent viscosity. Although the inherent viscosity of the copolyesters of the invention has not been measured, the molecular weights of the copolyesters of the invention are high enough to be in the fiber-forming range. The minimum fiber-forming molecular weight of the polymer is thought to be around 5,000. In most cases copolyesters of the invention have molecular weights above 8,000 and can have molecular weights as high as around 20,000 and in some instances the molecular weights can range up to 25,000 or even higher.

We claim:

1. A copolyester having a fiber-forming molecular weight consisting essentially of the following divalent radicals:

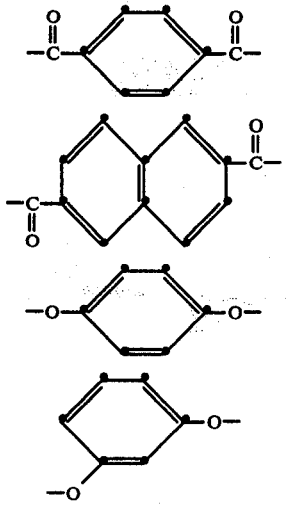

wherein the range of

is from 20 to 50 mole percent, based on the total moles of

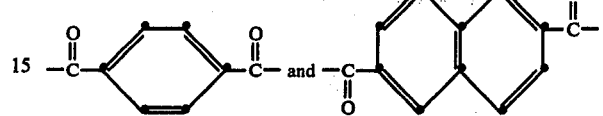

combined, and the range of

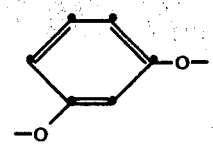

is from 20 to 50 mole percent, based on the total moles of

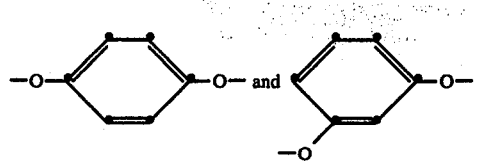

combined.

2. The polyester of claim 1 wherein the range of

is from 30 to 45 mole percent and the range of

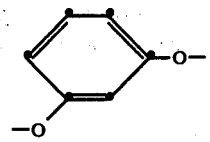

is from 30 to 50 mole percent.